United States Patent
Maheshwari et al.

(10) Patent No.: US 12,389,267 B2
(45) Date of Patent: Aug. 12, 2025

(54) METHOD FOR OPTIMAL RESOURCE ALLOCATION DURING RRC CONNECTION ESTABLISHMENT IN 5G

(71) Applicant: SAMSUNG ELECTRONICS CO., LTD., Suwon-si (KR)

(72) Inventors: Isha Maheshwari, Karnataka (IN); Poornima Mullagiri, Karnataka (IN); Raju Gupta, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 17/865,837

(22) Filed: Jul. 15, 2022

(65) Prior Publication Data
US 2023/0013712 A1   Jan. 19, 2023

(30) Foreign Application Priority Data

Jul. 16, 2021 (IN) .............................. 202141032043
Jul. 13, 2022 (IN) .............................. 2021 41032043

(51) Int. Cl.
*H04W 28/06* (2009.01)
*H04L 1/08* (2006.01)
*H04W 74/0833* (2024.01)

(52) U.S. Cl.
CPC .............. *H04W 28/06* (2013.01); *H04L 1/08* (2013.01); *H04W 74/0833* (2013.01)

(58) Field of Classification Search
CPC . H04W 28/06; H04W 76/27; H04W 74/0833; H04L 1/08
See application file for complete search history.

(56) References Cited

U.S. PATENT DOCUMENTS

2020/0404640 A1   12/2020   Coll et al.
2022/0014337 A1*  1/2022   Ouchi ............... H04W 74/0808

FOREIGN PATENT DOCUMENTS

CN           116724654 A  *  9/2023  ............. H04B 1/713
WO   WO-2013011233 A1  *  1/2013  ......... H04L 65/1006
WO       2019/062582         4/2019

OTHER PUBLICATIONS

Https://gitlab.openxg.org.cn/wangwenhui/ran/-/blob/8e91fab0cb687044e1e65bd1a3916f5e491d5787/openair2/LAYER2/MAC/eNB_scheduler_RA_NB_IoT.c, Date: Jan. 15, 2019, Author: Nick Ho., Publisher: OpenXG-RAN [retrieved on Nov. 14, 2024], retransmitting Msg4 timing doc for the NPL.*

(Continued)

*Primary Examiner* — Rebecca E Song
*Assistant Examiner* — Ziba Ebrahimian
(74) *Attorney, Agent, or Firm* — Nixon & Vanderhye P.C.

(57) ABSTRACT

The disclosure relates to a 5G or 6G communication system for supporting a higher data transmission rate. Embodiments herein provide a method for optimizing resource allocation to allocate one or more resources of a base station to a user equipment (UE). The method comprises receiving, by the base station, Message 3 (Msg3) from the UE; determining, by the base station, whether an optimizing feature is enabled; and performing, by the base station, one of: using a timer associated with transmission of a Message 4 (Msg4) for optimizing the resource allocation in response to the determination that the optimizing feature is enabled; and determining that at least condition is met for optimizing the resource allocation in response to the determination that the optimizing feature is disabled.

8 Claims, 13 Drawing Sheets

(56) References Cited

OTHER PUBLICATIONS

Indian Office Action issued Jun. 15, 2023 in corresponding Indian Patent Application No. 202141032043.
Khlass et al., "On the Flexible and Performance-Enhanced Radio Resource Control for 5G NR networks", IEEE, 2019, 6 pages.
3rd Generation Partnership Project; Technical Specification Group Radio Access Network; Study on Scenarios and Requirements for Next Generation Access Technologies, 3GPP TR 38.913 V0. 2.1, Mar. 2016, 29 pgs.
3rd Generation Partnership Project; Technical Specification Group Radio Access Network; Study on RAN Improvements for Machine-type Communications, 3GPP TR 37.868 V11.0.0, Sep. 2011, 28 pgs.
3rd Generation Partnership Project; Technical Specification Group Radio Access Network; Evolved Universal Terrestrial Radio Access (E-UTRA); Further advancements for E-UTRA physical layer aspects, 3GPP TR 36.814 V9.2.0, Mar. 2017, 105 pgs.
Larmo et al, RAN overload control for Machine Type Communications in LTE, IEEE, 2012, 6 pgs.
3rd Generation Partnership Project; Technical Specification Group Radio Access Network; NR; Radio Resource Control (RRC) protocol specification , 3GPP TS 38.331 V15.17.0, Mar. 2022, 543 pgs.
3rd Generation Partnership Project; Technical Specification Group Radio Access Network; NR; Medium Access Control (MAC) protocol specification , 3GPP TS 38.321 V15.13.0, Mar. 2022, 79 pgs.
Pocovi et al., Achieving Ultra-Reliable Low-Latency Communications: Challenges and Envisioned System Enhancements, 5G for Ultra-Reliable Low-Latency Communications, IEEE Network, Mar./Apr. 2018, 8 pages.

\* cited by examiner

METHOD FOR OPTIMAL RESOURCE ALLOCATION DURING RRC CONNECTION ESTABLISHMENT IN 5G

CROSS-REFERENCE TO RELATED APPLICATIONS

This application is based on and claims priority under 35 U.S.C. § 119 to Indian Provisional Patent Application No. 202141032043, filed on Jul. 16, 2021, in the Indian Patent Office, and to Indian Complete Patent Application No. 202141032043, filed on Jul. 13, 2022, in the Indian Patent Office, the disclosures of which are incorporated by reference herein in their entireties.

BACKGROUND

Field

The disclosure relates to a wireless network and, for example, to a method and device for optimal resource allocation during Radio Resource Control (RRC) connection establishment in 5th Generation technology (5G).

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 5G New Radio (NR) mobile networks as mentioned in the 3GPP are expected to support diverse use-cases which can be broadly classified into three categories enhanced mobile broadband (eMBB), massive machine type communications (mMTC) and ultra-reliable low-latency communications (uRLLC). Owing to stringent requirements on reliability and latency, uRLLC is most challenging design for which reliability is defined as probability of successful data delivery within a specified time duration. In June 2018, the 3GPP finalized Release 15 specifications, which are the first 5G New Radio (NR) standard including Non-Standalone and Standalone modes.

While the NR Radio Resource Control (RRC) inherits "RRC_IDLE" and "RRC_CONNECTED" state from Long Term Evolution (LTE), there is a third state "RRC_INACTIVE" introduced to reduce RRC signalling, conserve a User Equipment (UE) battery and transmit/receive data at faster pace.

As a fundamental procedure in the 5G, RRC Connection Establishment procedure allows the UE to access serving cell by transfer UE's state from RRC_IDLE to RRC_CONNECTED. Another similar procedure, RRC connection reestablishment (RRE) allows the UE to recover from Radio Link Failure (RLF) and re-establish RRC connection with to a network device (e.g., gNB) on same or different serving cell to continue user activity. RRC connection establishment or re-establishment mostly involves Contention-based Random Access (CBRA) procedure for access to the serving cell.

However, in NR, the UE can resume the connection from RRC_INACTIVE to RRC_CONNETED state to reduce signalling overhead and latency required to setup the RRC connection. When UE requests for New setup connection from the RRC_IDLE state, Message3 (Msg3) and Message4 (Msg4) would contain RRCSetupRequest and RRCSetup respectively. When UE resumes from the RRC_INACTIVE state to the RRC_CONNECTED state, the Msg3 and the Msg4 would contain RRCResumeRequest/Request1 and RRCResume respectively. As part of contention resolution mechanism, the UE starts a Contention Resolution Timer (CRT) after the Msg3 transmission and waits for the Msg4 reception before the CRT expiry. The CRT will be stopped once the UE receives the Msg4 from the network device. If the CRT expires, the UE aborts ongoing procedure and reinitiates new CBRA procedure. Generally, the network device MAC scheduler allocates highest priority to the UE performing CBRA procedure and the Msg4 for the UE will be scheduled within the CRT.

However, there are some situations which cause significant delay in processing of the Msg4 leading to scheduling of the Msg4 happens after expiry of the CRT. Generally, the UE may not be listening to the scheduling of the Msg4 after the CRT expiry, thus the network device MAC ends up scheduling of the Msg4 for maximum number of transmissions leading to resource wastage which otherwise would have utilised for other UEs.

Thus, it is desired to address the above mentioned disadvantages or other shortcomings or at least provide a useful alternative.

SUMMARY

Embodiments of the disclosure provide a method implemented by the network device for optimal resource allocation during Radio Resource Control (RRC) connection establishment. In the present disclosure, the network device maintains an "Msg4 schedule expiry" timer for all the UEs which are in communication with the network device. The Msg4schedule expiry timer will be expired when the CRT of the corresponding UE expires, thereby the network device stops transmitting/re-transmitting the Msg4 avoiding the wastage of the resources compared to the conventional manual method of re-transmitting the Msg4 even after the expiry of the CRT.

Embodiments of the disclosure provide the network device for optimal resource allocation during Radio Resource Control (RRC) connection establishment. The network device may be a base station.

Accordingly an example embodiment provides a method for optimizing resource allocation to allocate one or more resources of a network device to at least one user equipment (UE). The method comprises receiving, by the network device, Message 3 (Msg3) from the UE; determining, by the network device, whether an optimizing feature is enabled; and performing, by the network device, one of: using a timer associated with transmission of a Message 4 (Msg4) for optimizing the resource allocation in response to the determination that the optimizing feature is enabled; and determining that at least condition is met for optimizing the resource allocation in response to the determination that the optimizing feature is disabled.

Accordingly an example embodiment provides a device to optimize resource allocation to allocate one or more resources to at least one user equipment (UE). The device comprises a memory; and a processor, coupled to the memory. The processor is configured to receive a Message 3 (Msg3) from the at least one UE; determine whether an optimizing feature is enabled; and perform one of: use a timer associated with transmission of a Message 4 (Msg4) for optimizing the resource allocation in response to the determination that the optimizing feature is enabled; and determine that at least condition is met for optimizing the resource allocation in response to the determination that the optimizing feature is disabled.

These and other aspects of the embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
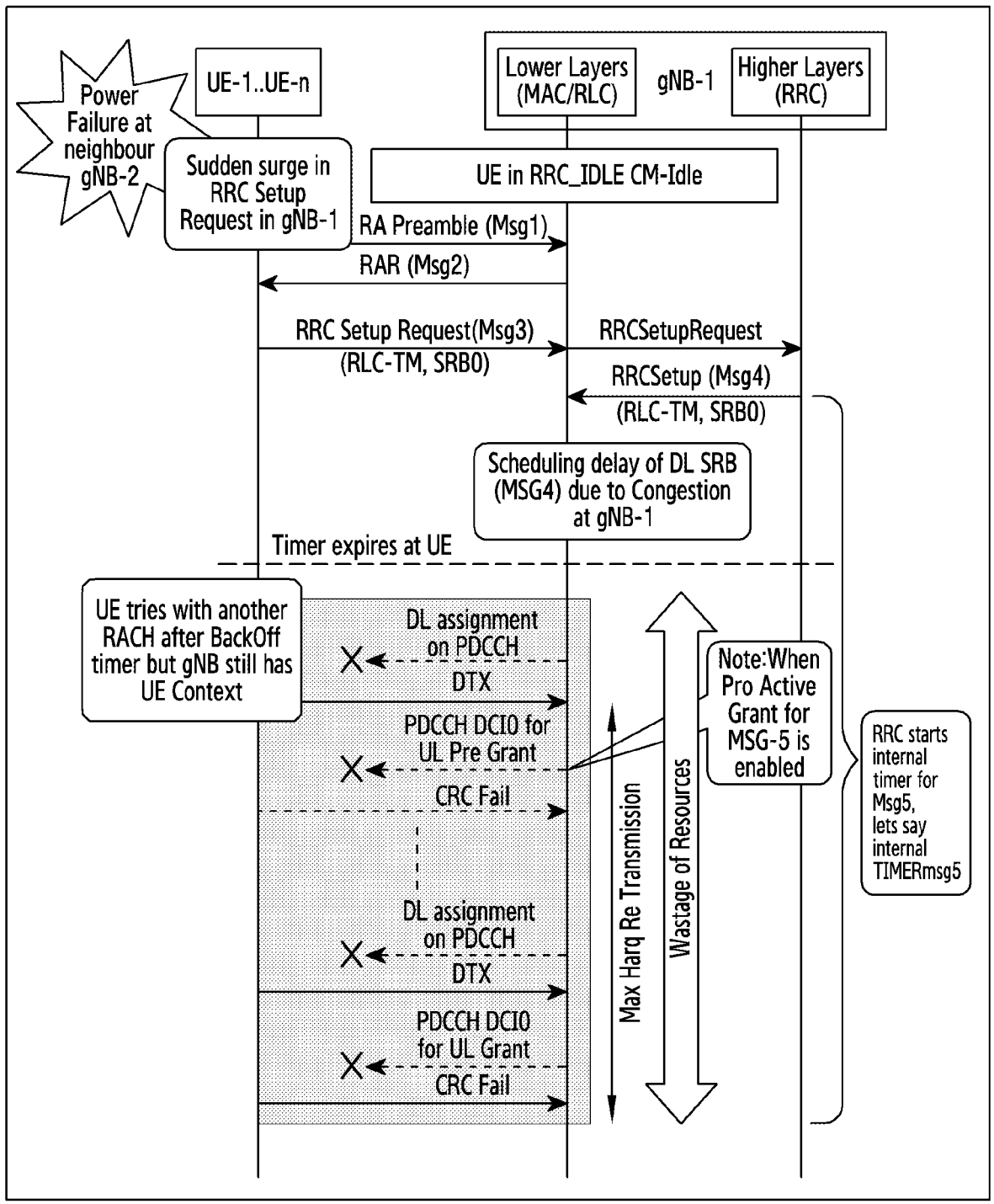
FIG. 1A illustrates a scenario of RRC connection establishment procedure when there is a congestion at the network device, according to the prior arts.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiment herein is to provide a method for optimizing resource allocation to allocate one or more resources of a network device to a user equipment (UE). The method comprises receiving, by the network device, a Message 3 (Msg3) from the UE; determining, by the network device, whether an optimizing feature is enabled; and performing, by the network device, one of: using a timer associated with transmission of at least one Message 4 (Msg4) for optimizing the resource allocation in response to the determination that the optimizing feature is enabled; and determining that is met for optimizing the resource allocation in response to the determination that the optimizing feature is disabled. In the conventional methods, even after the expiry of the CRT, the network device re-transmits the Msg4 when the UE aborts ongoing procedure and reinitiates new CBRA procedure. This leads to resource wastage which otherwise would have utilised for other UEs.

Unlike to the conventional methods, in the present disclosure the network device maintains an "Msg4schedule expiry" timer for all the UEs which are in communication with the network device. The Msg4schedule expiry timer will be expired when the CRT of the corresponding UE expires, thereby the network device stops transmitting/re-transmitting the Msg4 avoiding the wastage of the resources.

Referring now to the drawings and more particularly to FIGS. 1A through 5C, where similar reference characters denote corresponding features consistently throughout the figures, there are shown various example embodiments.

FIG. 1A illustrates a scenario of RRC connection establishment procedure when there is a congestion at the network device, according to the prior arts.

Referring to FIG. 1A, the UE triggers RRCSetupRequest and starts CR timer expecting RRCSetup from a network device 1 (e.g., gNB1). However, due to power failure at neighboring network device 2 (e.g., gNB2), all UEs of the gNB2 try to access the gNB1 and there is a sudden surge in connection setup requests. This will cause delay at the RRC to prepare RRCSetup and in scheduling of Msg4 due to congestion at MAC. This results into CR timer expiry at the UE and the UE re-tries next preamble attempt. Having not known about UE's CR timer expiry, the network device MAC continues to schedule the Msg4 which UE may not be listening, leading to resource wastage. The network device may be a gNB (gNodeB) or an eNB (eNodeB).

Figure 1B:
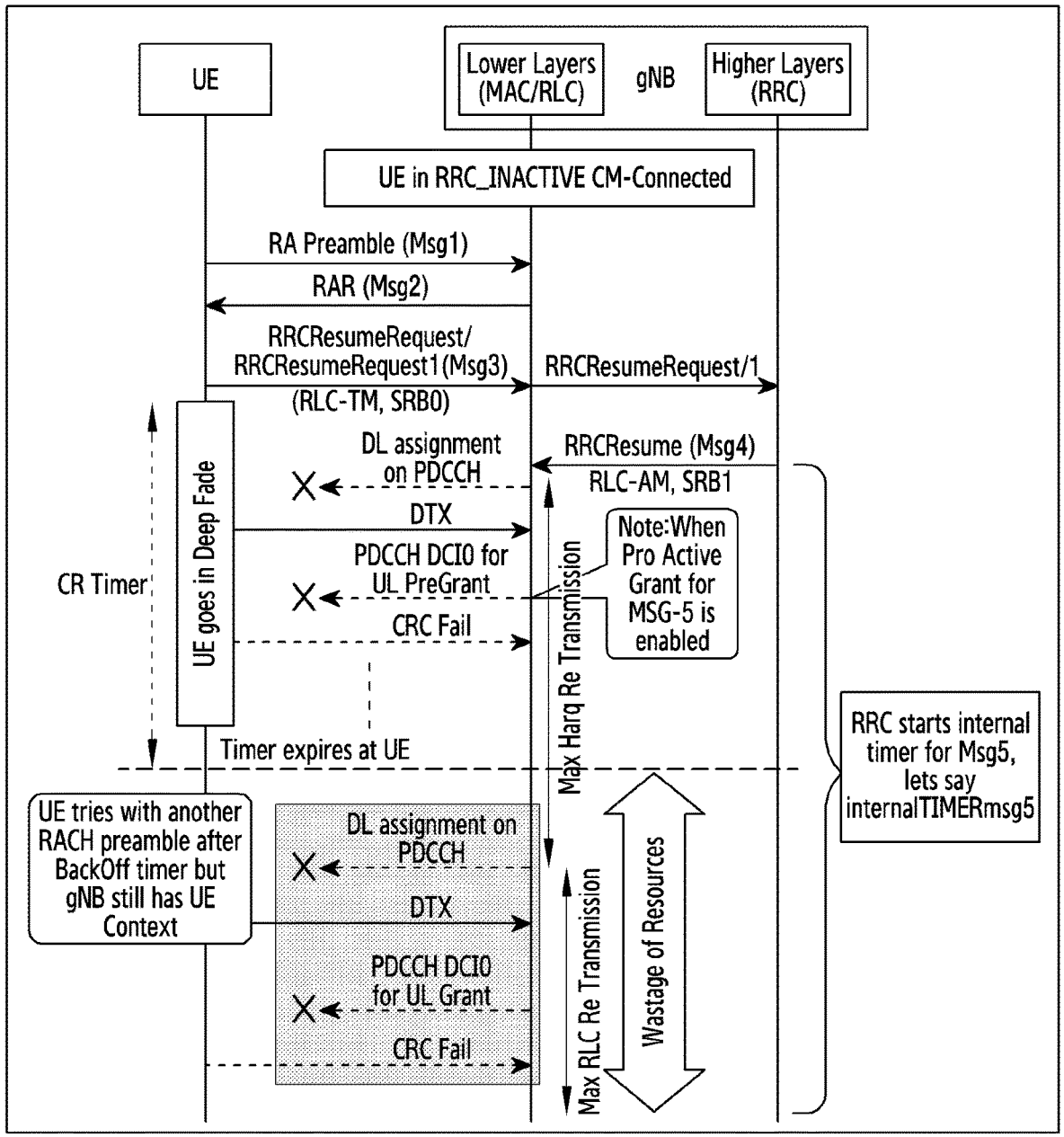
FIG. 1B illustrates a scenario of RRC connection establishment procedure when there is a Physical Downlink Control Channel (PDCCH) missing, according to the prior arts.

FIG. 1B illustrates a scenario of RRC connection establishment procedure when there is a PDCCH missing, according to the prior arts.

Referring to FIG. 1B, consider a conventional method, illustrates the scenario of a Physical Downlink Control Channel (PDCCH) missing during RRC Inactive to RRC Connected state transition.

When the UE triggers state transition due to UpLink (UL) packet arrival from application layer. The RRCResume is scheduled by MAC, however, if the UE suddenly goes through a deep fade and miss to decode scheduling information for maximum retransmissions duration at MAC and RLC. Meanwhile, the CR timer is expired for the UE not receiving CR identity as part of CBRA procedure, this can cause wastage of resources.

Further, few vendor implementation involves providing proactive uplink grant for RRC connection setup complete (Msg5) transmission as soon as Msg4 scheduling starts to reduce establishment delay. This would cause resource wastage in uplink. Depending on RLC mode transmission of the Msg4, the resource wastage duration would vary from maximum retransmissions at MAC to maximum retransmission at MAC and RLC.

Figure 1C:
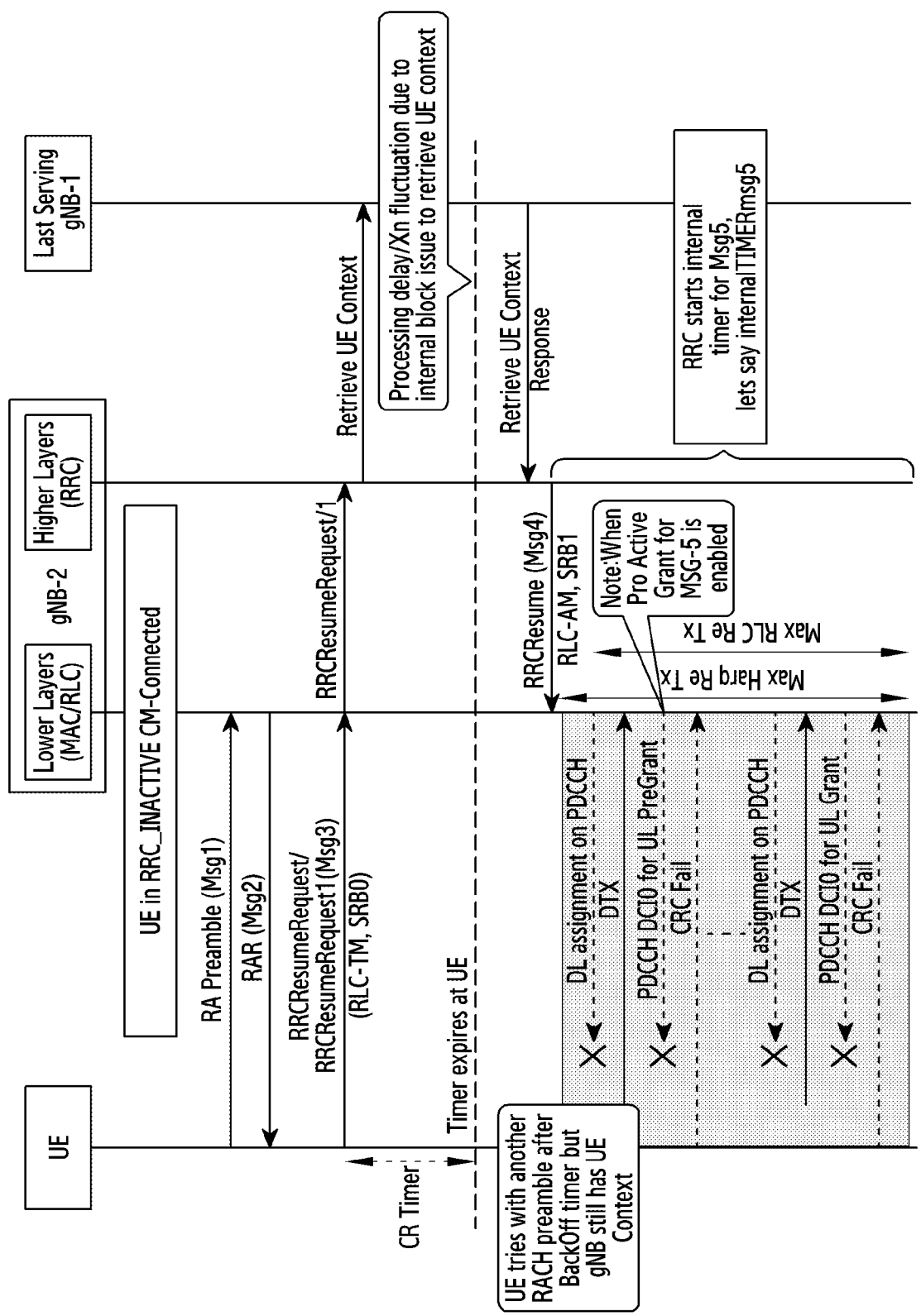
FIG. 1C illustrates a scenario of RRC connection establishment procedure when there is a processing delay or fluctuation of Xn connection, according to the prior arts.

FIG. 1C illustrates a scenario of RRC connection establishment procedure when there is a processing delay or fluctuation of Xn connection, according to the prior arts.

Referring to FIG. 1C consider a conventional method, illustrates the scenario of processing delay or Xn connection failure during RRC Inactive to RRC Connected state transition.

The UE transmits RRCResumeRequest/Request1 and starts CR timer. The UE would initiate this transition e.g.: when there is RNA update. When gNB2 receives Msg3, it tries to retrieve UE context from last serving gNB1. If there is internal processing delay or Xn connection fluctuation between gNbs to retrieve UE context, gNB2 RRC prepares and transfers RRCResume to MAC with delay which results into UEs CR timer expiry and it may not be decoding Msg4 scheduling further resulting into wastage of MAC resources.

Figure 2A:
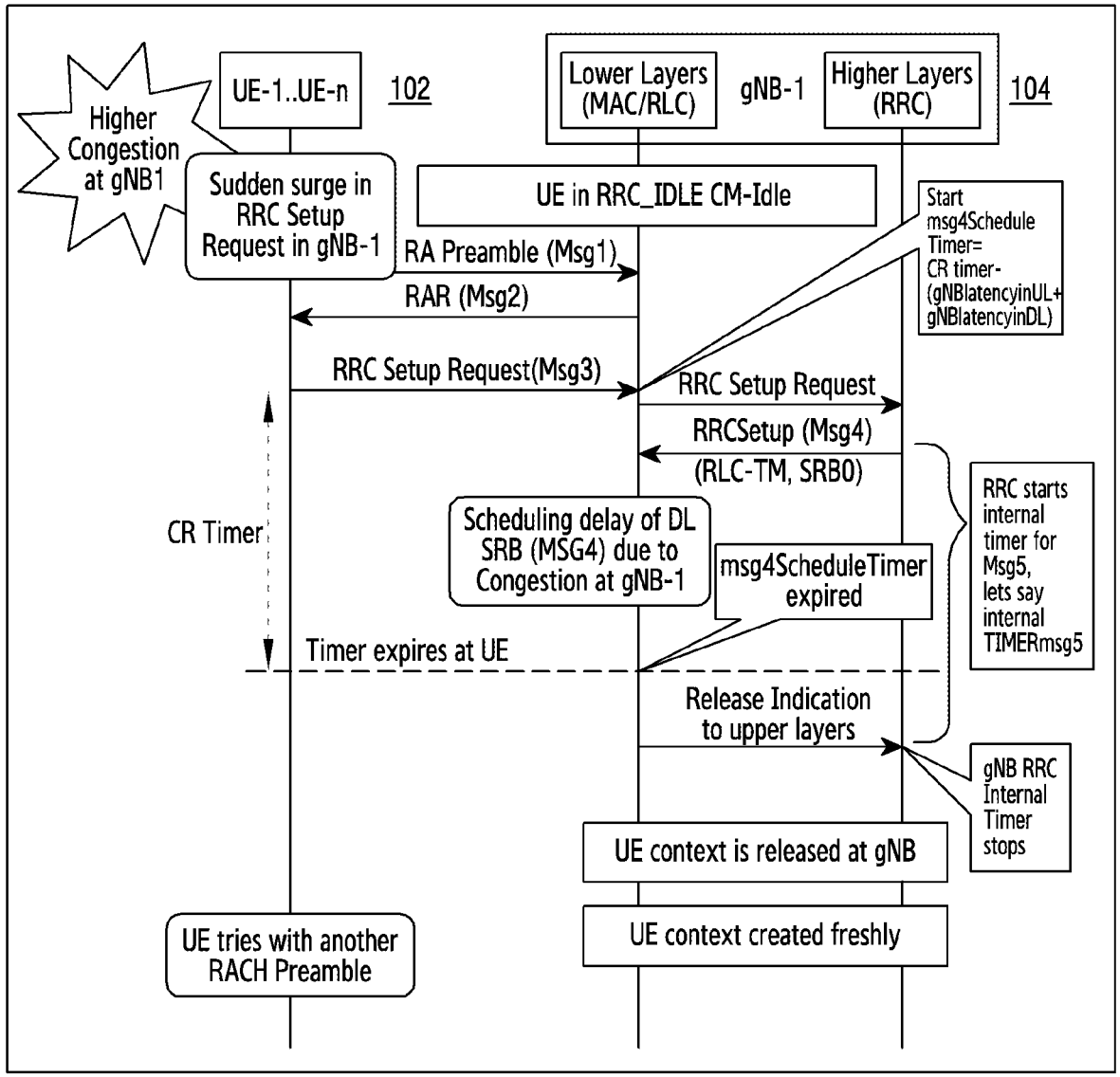
FIG. 2A illustrates a CRT expiry aware scheduling implementation, according to the embodiments as disclosed herein.

FIG. 2A illustrates a CRT expiry aware scheduling implementation, according to the embodiments as disclosed herein.

Unlike to the conventional methods, the "CRT Expiry Aware" scheduling is realized by introducing a new timer called as Msg4ScheduleTimer at the network device 104. This timer is maintained specific to each UE 102. The Msg4ScheduleTimer helps the network device 104 to predict that when above three issue scenario happens (e.g., Delay in scheduling Msg4 due to congestion or Processing delay or Xn connection failure or missing of PDCCH for Poor RF UE) which is quite frequent in real field deployments, and at the UE 102 side CRT timer expires. The following steps are performed between the UE 102 and the network device 104.
1. On receiving RRC Setup Request/RRC Resume Request (Msg3) from the UE 102, start the Msg4ScheduleTimer corresponding to that UE 102.
2. Schedule RRC Setup/RRC resume (Msg4) to the UE 102 (in response to the received Msg3), only as long as its Msg4ScheduleTimer is running
3. Stop the Msg4ScheduleTimer when Msg4 is scheduled successfully within CRT window.
4. 5) Upon expiry of the Msg4ScheduleTimer, the network device 104 (e.g., gNB) MAC aborts subsequent Msg4 and Msg5 scheduling (if Pro-active grant is supported by vendor) of the UE 102.

The value of Msg4ScheduleTimer depends upon how long the network device 104 may wait to schedule the Msg4 when above said problem happens to avoid any resource wasting and blocking it for other UEs 102. Therefore, the network device 104 can simple derive the value of Msg4ScheduleTimer based on CRT timer which is started at the UE 102 side after transmitting Msg3, Internal processing delay of Msg3(gNBlatencyinUL) and Msg4(gNBlatencyinDL) as shown in eq. (1). The values of gNBlatencyinUL/DL are determined based on time of processing of Msg3 and Msg4 at lower layers.

Msg4ScheduleTimer=CR timer−gNBlatencyinDL−gNBlatencyinUL . . . (1)

When Msg4ScheduleTimer expires, the network device MAC abort Msg4 and Msg5 scheduling (if proactive grant is supported by vendor). Upon successful delivery of Msg4, timer stops.

Figure 2B:
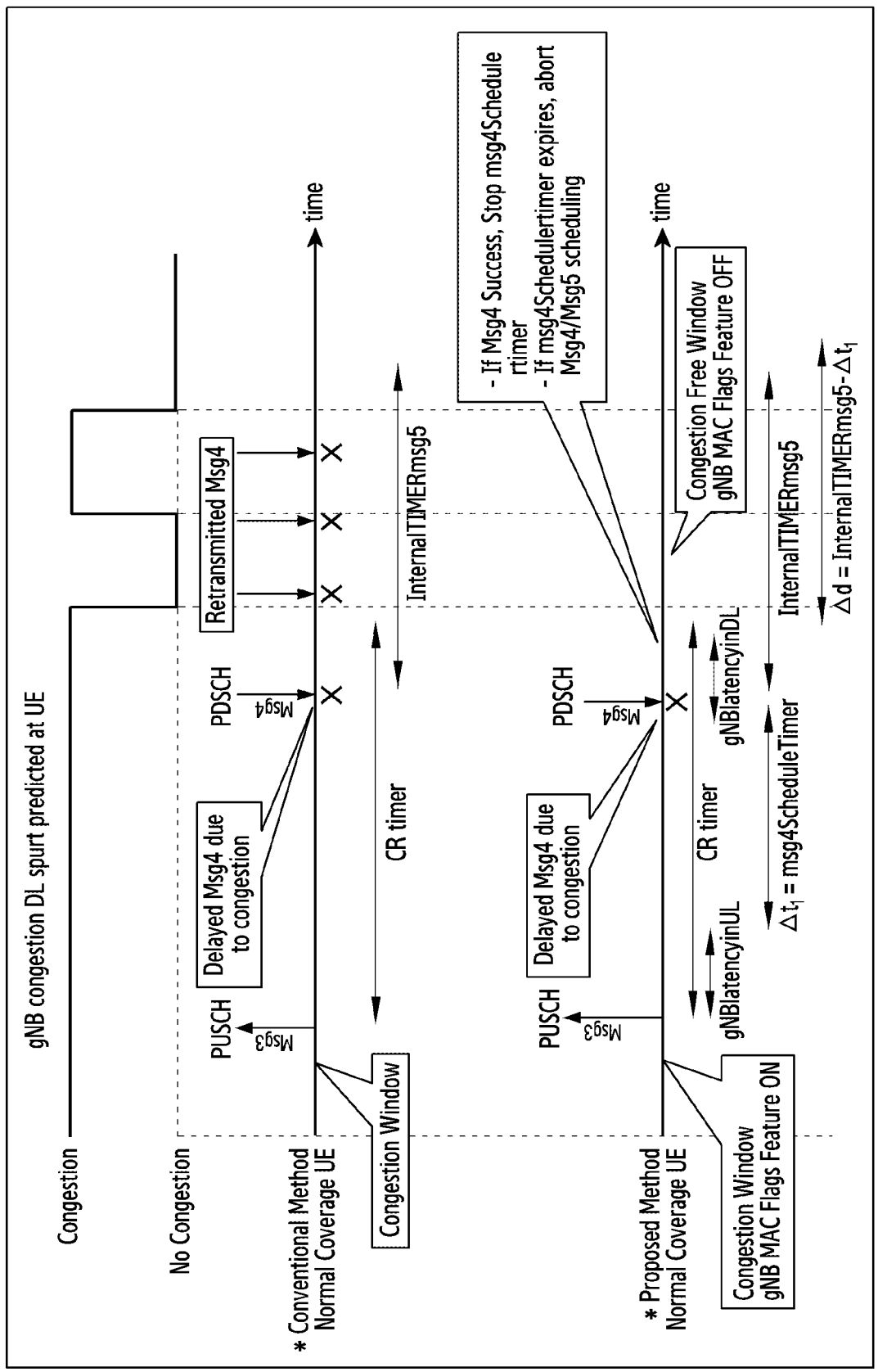
FIG. 2B illustrates a timing diagram of the CRT expiry aware scheduling, according to the embodiments as disclosed herein.

Thus, the "CRT Expiry Aware" scheduling approach shall inhibit the network device 104 to schedule downlink transmission or retransmission of the Msg4 after CRT expiry at the UE 102 side during problematic scenarios, as shown in FIG. 2B, thereby averting the wastage of DL resources. Additionally, when Pro Active grant of Msg5 is supported by the vendor which helps to speed up the process of RRC Connection establishment and the network device 104 provides Pre Grant to the UE 102 to send RRC Setup complete before receiving the feedback of the Msg4, by this timer introduction, resource savings in uplink is also possible in a great extent.

The implementation of the disclosed scheduling approach requires maintaining the UE 102 specific timer at the network device 104 and using the same for making the scheduling decision. This makes the implementation very simple without any memory or computational overheads.

Figure 3:
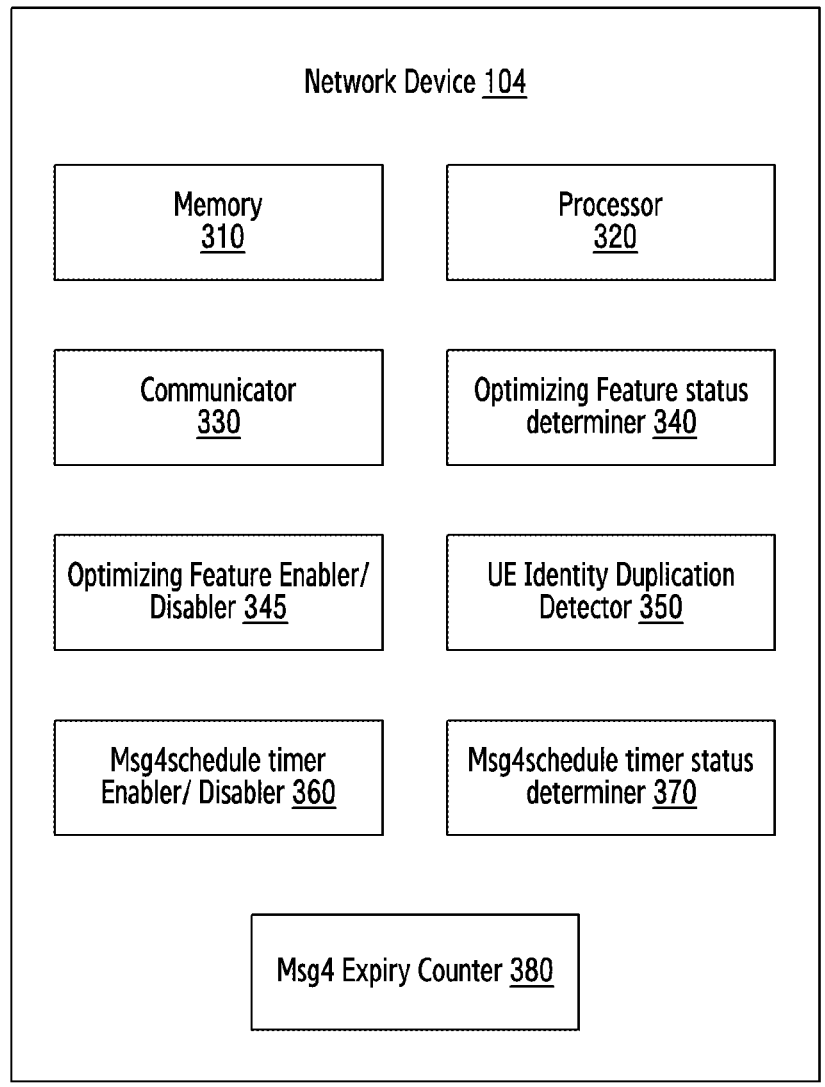
FIG. 3 illustrates a block diagram of the network device for optimizing resource allocation, according to the embodiments as disclosed herein.

FIG. 3 illustrates a block diagram of the network device 104 for optimizing resource allocation, according to the embodiments as disclosed herein. In an embodiment, the network device 104 includes a memory 310, a processor 320, a communicator 330, an optimizing feature status determiner 340, an optimizing feature enabler/disabler 345, a UE identity duplication detector 350, an Msg4schedule timer start/stop 360, and an Msg4schedule timer status determiner 370, and an Msg4schedule expiry counter 380. According to various embodiments of the present disclosure, the network device may be a gNB or a base station.

The memory 310 also stores instructions to be executed by the processor 320. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache). In an embodiment, the memory 310 can be an internal storage unit or it can be an external storage unit of the network device 104, a cloud storage, or any other type of external storage.

The processor 320 communicates with the memory 310, the communicator 330, the optimizing feature status determiner 340, the optimizing feature status enabler/disabler 345, the UE identity duplication detector 350, the Msg4schedule timer start/stop 360, and the Msg4schedule timer status determiner 370, and the Msg4schedule expiry counter 380. The processor 320 is configured to execute instructions stored in the memory 310 and to perform various processes.

The communicator 330 is configured for communicating internally between internal hardware components and with external devices via one or more networks.

In an embodiment, the communicator 330 is configured to receive a Message 3 (Msg3) from the UE 102. In one embodiment, the Msg3 includes RRC step-up request message when the UE 102 is transiting from the RRC_IDLE state to the RRC_Connected state. In an embodiment, the Msg3 includes RRC resume request message when the UE 102 is transiting from the RRC_INACTIVE state to the RRC_Connected state.

In one embodiment, the optimizing feature status determiner 340 is configured to determine a status of an optimizing feature. In one embodiment, the optimizing feature is introduced to optimize the resource allocation during the RRC connection establishment to avoid resource wastage. The optimised/saved resources are defined in terms of either ResourceBlocks(RB) or scheduling opportunities which can be used for either cell capacity or coverage enhancement depending on the cell load and traffic. When the optimizing feature status is disabled, the flow proceed to the UE identity duplication detector 350. When the optimizing feature status determiner 340 determines that the optimizing feature status is enabled, the flow proceed to the Msg4schedule timer start/stop 360.

In one embodiment, the UE identity duplication detector 350 is configured to determine that a duplication of a UE identity (UE ID) has occurred based on the received Msg3. The UE identity duplication detector 350 is then configured to increment a UE ID duplication counter in response to the determination that the duplication of the UE ID occurred. The UE identity duplication detector 350 is then configured to determine whether the UE ID duplication counter meets a first criteria. In one embodiment, the first criteria indicates that the UE ID duplication counter is greater than a UE ID duplication threshold value. When the UE ID duplication counter meets a first criteria, the Optimizing feature enabler/disabler 345 enables the optimizing feature. When the UE ID duplication counter does not meets a first criteria, the Optimizing feature enabler/disabler 345 disables the optimizing feature.

In one embodiment, the Msg4schedule timer start/stop 360 is configured to receive a status of the optimizing feature from the optimizing feature status determiner 340. When the optimizing feature is enabled, the Msg4schedule timer start/stop 360 is enabled and the communicator 330 transmit Msg4 to the UE 102.

In one embodiment, the Msg4schedule timer status determiner 370 is configured to determine a status of the Msg4schedule timer. If the Msg4schedule timer status determiner 370 determines that the Msg4schedule timer is not expired, the Msg4schedule timer status determiner 370 is configured to determine whether an acknowledgment (ack) is received for the transmitted. If the acknowledgment is received, the Msg4schedule timer start/stop 360 is configured to disable the Msg4schedule timer. If the acknowledgment is not received, the Msg4 is re-transmitted till the expiry of Msg4schedule timer. If the Msg4schedule timer status determiner 370 determines that the Msg4schedule timer is expired, the Msg4 re-transmitter 380 aborts the re-transmission of the Msg4, increments an Msg4schedule expiry counter 380, and determines whether the Msg4schedule expiry counter 380 meets a second criteria. In one embodiment, the second criteria indicates the Msg4schedule expiry counter 380 is greater than an Msg4schedule expiry threshold value.

In one embodiment, the Msg4 re-transmitter is configured to determine whether the Msg4schedule expiry counter 380 meets the second criteria. When the Msg4schedule expiry counter 380 is greater than the Msg4schedule expiry threshold value, the Msg4 re-transmitter is configured to reset the UE ID duplication counter & the Msg4schedule expiry counter 380, and disable the optimizing feature. When the Msg4schedule expiry counter 380 is less than the Msg4 expiry threshold value, the Msg4 re-transmitter is configured to reset the Msg4schedule expiry counter 380 and continue the optimizing feature is enabled state.

Although FIG. 3 shows various hardware components of the network device 104 but it is to be understood that other embodiments are not limited thereon. In other embodiments, the network device 104 may include less or more number of components. Further, the labels or names of the components are used only for illustrative purpose and does not limit the scope of the disclosure. One or more components can be combined together to perform same or substantially similar function for optimizing the resource allocation.

Figure 4A:
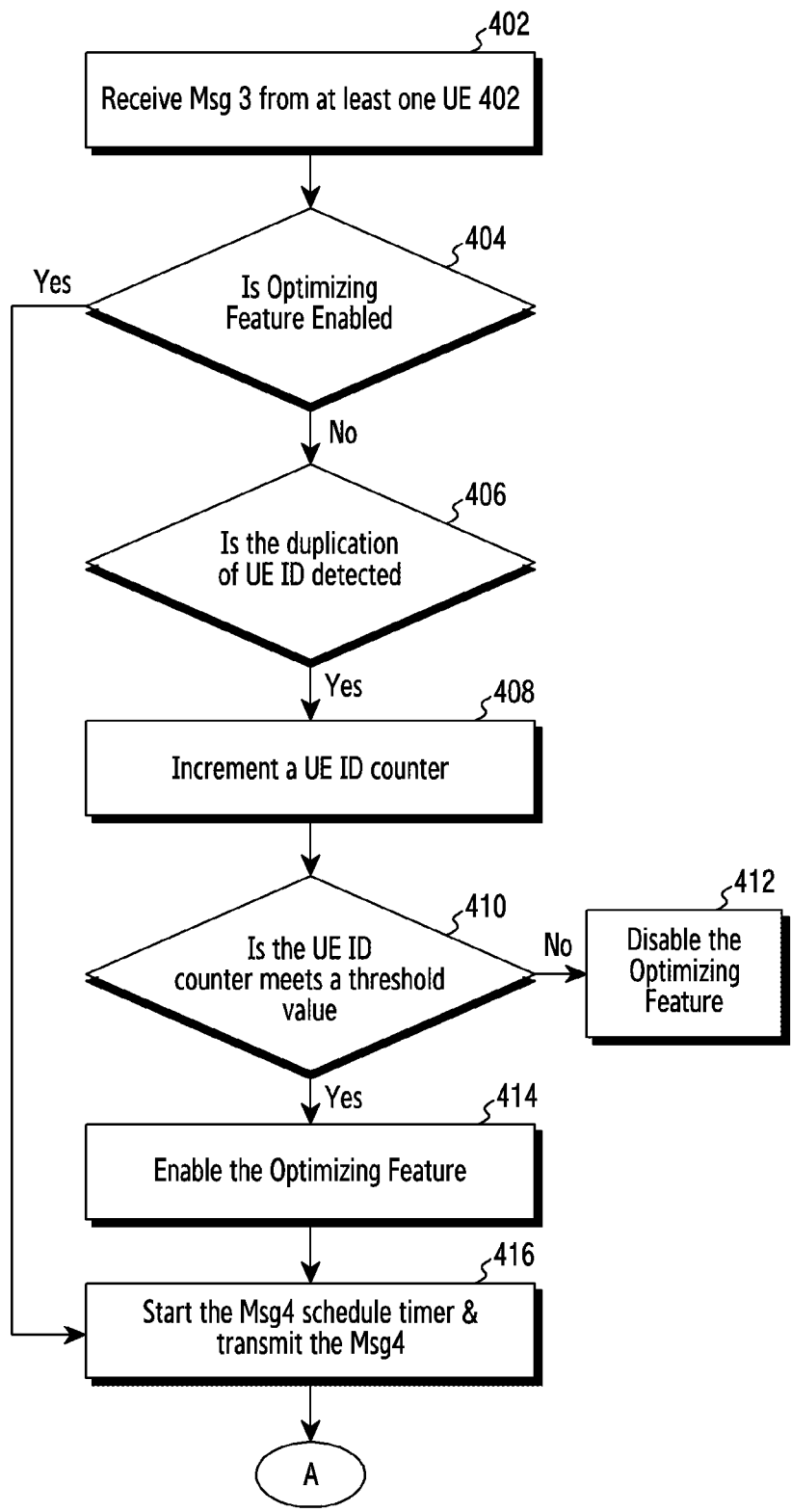
FIGS. 4A and 4B illustrate a flow diagram of a network device method for optimizing the resource allocation, according to the embodiments as disclosed herein.
Figure 4B:
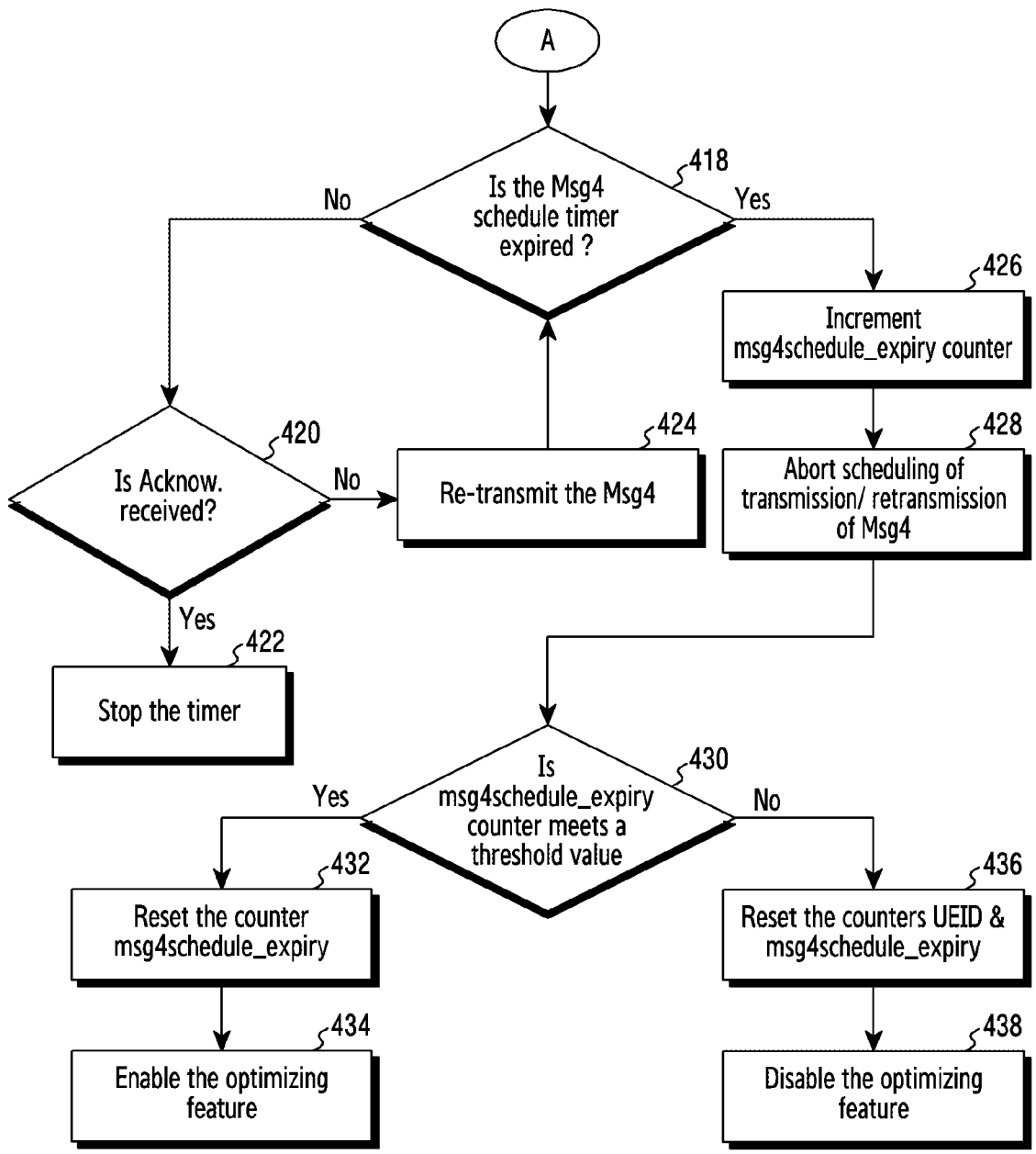

FIGS. 4A and 4B illustrate a flow diagram of a network device method for optimizing the resource allocation, according to the embodiments as disclosed herein.

At 402, the method includes receiving, by the network device 104, Message 3 (Msg3) from the UE 102. In one embodiment, the Msg3 includes RRC step-up request message when the UE 102 is transiting from the RRC_IDLE state to the RRC_Connected state. In an embodiment, the Msg3 includes RRC resume request message when the UE 102 is transiting from the RRC_INACTIVE state to the RRC_Connected state.

At 404, the method includes determining, by the network device 104, whether an optimizing feature is enabled. In one embodiment, the optimizing feature status determiner 340 is configured to determine a status of an optimizing feature. In one embodiment, the optimizing feature is introduced to optimize the resource allocation during the RRC connection establishment. When the optimizing feature status is disabled, the flow proceed to 406. When the optimizing feature status determiner 340 determines that the optimizing feature status is enabled, the flow proceed to 416.

At block 406, the method includes determining, by the network device 104, that a duplication of at least one UE identity (UE ID) has occurred based on the received Msg3. In one embodiment, the UE identity duplication detector 350 is configured to determine that a duplication of at least one UE identity (UE ID) has occurred based on the received Msg3.

At block 408, the method includes incrementing, by the network device 104, a UE ID duplication counter in response to the determination that the duplication of the at least one UE ID occurred. The UE identity duplication detector 350 is then configured to increment a UE ID duplication counter in response to the determination that the duplication of the UE ID occurred.

At block 410, the method includes determining, by the network device 104, whether the UE ID duplication counter meets a first criteria. The UE identity duplication detector 350 is then configured to determine whether the UE ID duplication counter meets a first criteria. In one embodiment, the first criteria indicates that the UE ID duplication counter is greater than a UE ID duplication threshold value.

At block 412, the method includes disabling, by the network device 104, the optimizing feature. When the UE ID duplication counter does not meets a first criteria, the Optimizing feature enabler/disabler 345 disables the optimizing feature.

At block 414, the method includes enabling, by the network device 104, the optimizing feature. When the UE ID duplication counter meets a first criteria, the Optimizing feature enabler/disabler 345 enables the optimizing feature.

At block 416, the method includes enabling, by the network device 104, the Msg4schedule timer and transmit the Message 4 (Msg4) to the UE 102. In one embodiment, the Msg4schedule timer start/stop 360 is configured to receive a status of the optimizing feature from the optimizing feature status determiner 345. When the optimizing feature is enabled, the Msg4schdule timer enabler/disabler 360 is enabled and the communicator 330 transmit Msg4 to the UE 102.

At block 418, the method includes determining, by the network device 104, whether the Msg4schedule timer is expired. In one embodiment, the Msg4schedule timer status determiner 370 is configured to determine a status of the Msg4schedule timer.

At block 420, the method includes determining, by the network device 104, whether an acknowledgment is received. If the Msg4schedule timer status determiner 370 determines that the Msg4schedule timer is not expired, the Msg4schedule timer status determiner 370 is configured to determine whether an acknowledgment (ack) is received for the transmitted Msg4.

At block 422, the method includes stopping, by the network device 104, the Msg4schedule timer. If the acknowledgment is received, the Msg4schedule timer start/stop 360 is configured to disable the Msg4schedule timer.

At block 424, the method includes re-transmitting, by the network device 104, the Msg4. If the acknowledgment is not received, the Msg4 is re-transmitted till the expiry of Msg4schedule timer.

At block 426, the method includes incrementing, by the network device 104, the Msg4schedule expiry counter 380. If the Msg4schedule timer status determiner 370 determines that the Msg4schedule timer is expired, the Msg4 re-transmitter increments an Msg4schedule expiry counter 380.

At block 428, the method includes aborting, by the network device 104, scheduling of transmission/re-transmission of the Msg4. If the Msg4schedule timer status determiner 370 determines that the Msg4schedule timer is expired, the Msg4 re-transmitter aborts the re-transmission of the at least one Msg4.

At block 430, the method includes determining, by the network device 104, whether the Msg4schedule expiry counter 380 meets a second criteria or an elapsed time meets a third criteria. If the Msg4schedule timer status determiner 370 determines that the Msg4schedule timer is expired, the Msg4 re-transmitter determines whether the Msg4schedule expiry counter 380 meets a second criteria or an elapsed time meets a third criteria. In one embodiment, the second criteria indicates the Msg4schedule expiry counter is greater than an Msg4schedule expiry threshold value. In one embodiment, the third criteria indicates that the elapsed timer is less than or equal to a window of Msg4expiry.

At block 432, the method includes resetting, by the network device 104, the Msg4schedule expiry counter 380. When the Msg4schedule expiry counter 380 is less than the Msg4schedule expiry threshold value, the Msg4 re-transmitter is configured to reset the Msg4schedule expiry counter 380.

At block 434, the method includes continue enabling, by the network device 104, the optimizing feature. When the Msg4schedule expiry counter 380 is less than the Msg4schedule expiry threshold value, the optimizing feature is enabled.

At block 436, the method includes resetting, by the network device 104, the Msg4schedule expiry counter 380 and the UEID counter. When the Msg4schedule expiry counter 380 is greater than the Msg4schedule expiry threshold value or the elapsed time is less than or equal to the window of Msg4expiry, the Msg4 re-transmitter is configured to reset the UEID duplication counter 380 and the Msg4schedule expiry counter.

At block 438, the method includes disabling, by the network device 104, the optimizing feature. When the Msg4schedule expiry counter 380 is less than the Msg4 expiry threshold value and the elapsed time is greater than the window of Msg4expiry, the optimizing feature is disabled.

Figure 5A:
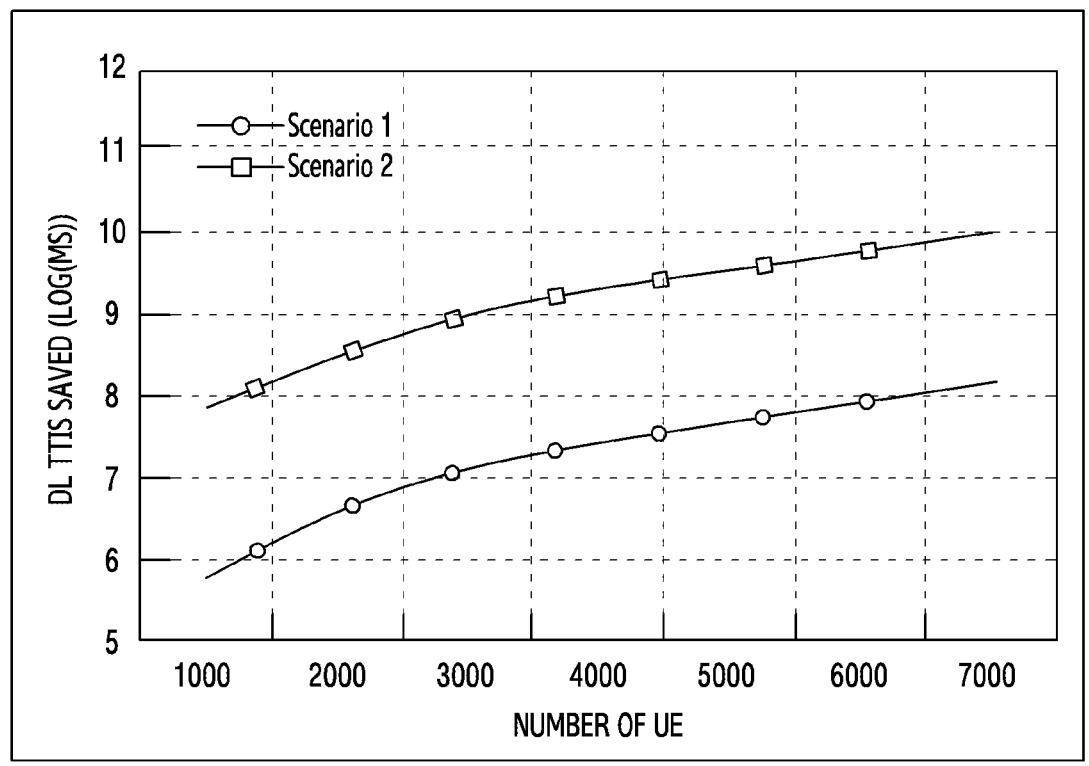
FIG. 5A is a graph illustrating downlink resource saving, according to the embodiments as disclosed herein.

FIG. 5A is a graph illustrating downlink resource saving, according to the embodiments as disclosed herein. Scenario is simulated using E500 UE simulator where large amount of users accesses the network within 10s according to time limited beta distribution. Three macro cell hexagonal layout is assumed with maximum cell radius of 500 meters (m). Uniformly distribution of Non-uRLLC and uRLLC devices is done. Traffic model is based on Frequency division multiplexing (FDD) type-1 radio frame structure and other parameters are assumed to accurately model the live network parameters.

An amount of resources saved through simulation based on traffic model is estimated as shown in FIG. 5A.

Figure 5B:
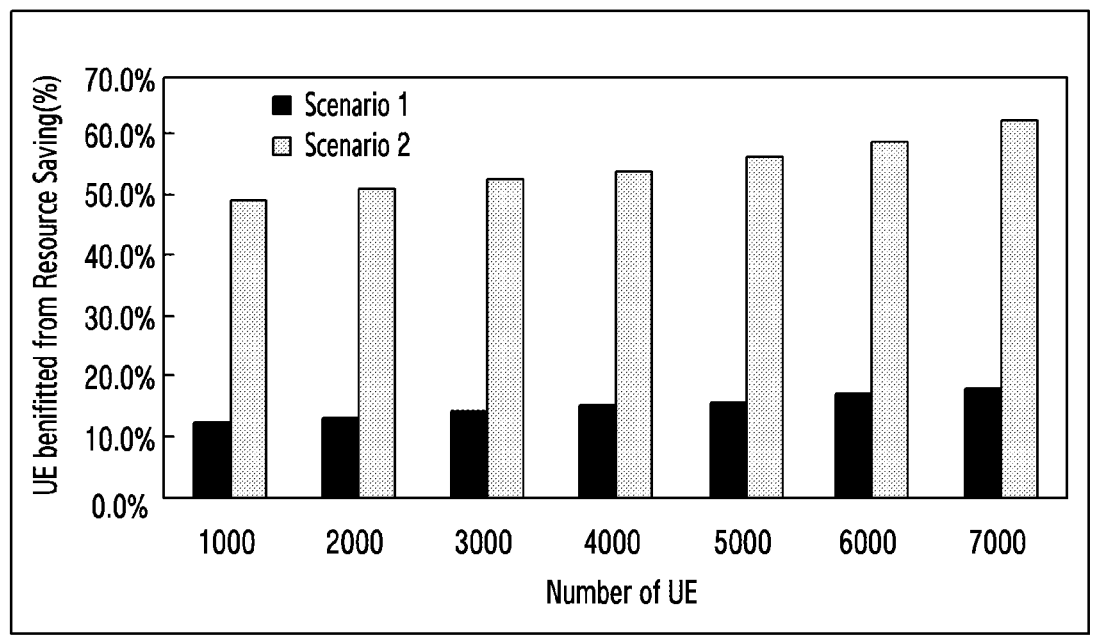
FIG. 5B is a graph illustrating number of UE benefited from resource saving, according to the embodiments as disclosed herein.

FIG. 5B is a graph illustrating number of UE benefited from resource saving, according to the embodiments as disclosed herein.

Figure 5C:
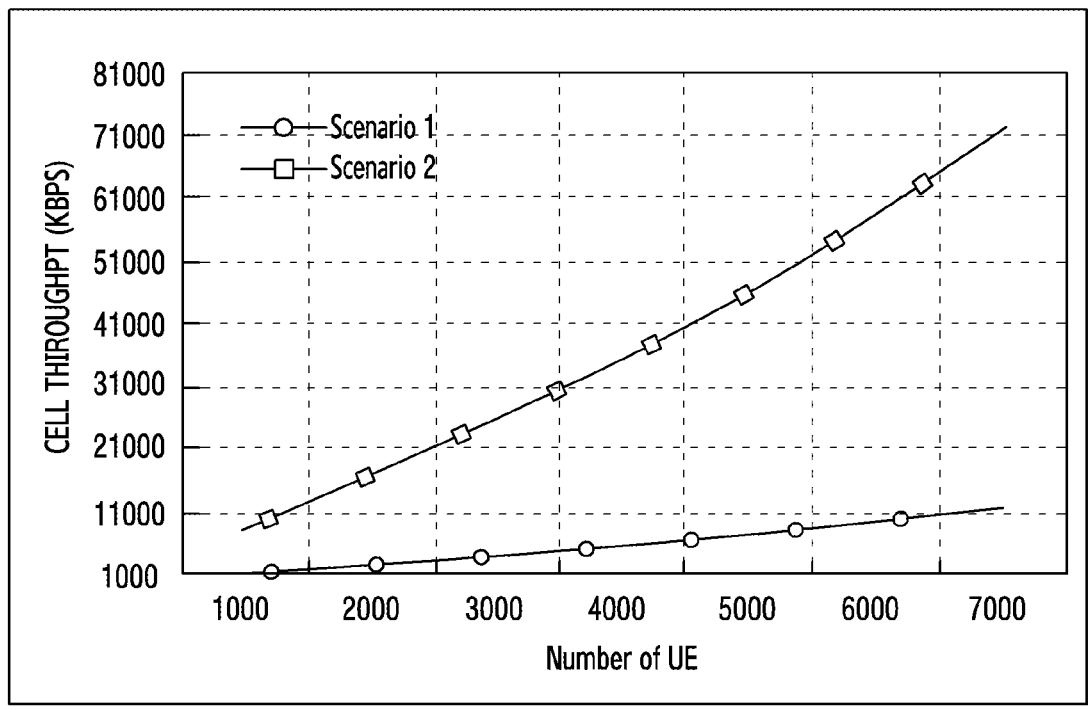
FIG. 5C is a graph illustrating number of bits saving, according to the embodiments as disclosed herein.

FIG. 5C is a graph illustrating number of bits saving, according to the embodiments as disclosed herein.

As shown in FIGS. 5B and 5C, under heavy traffic load (users ranging from 1k-7k), the present disclosure helps to save resources from 12% to 18% corresponding to low to high traffic. This number increases manifolds in RRC Inactive state (Scenario 2) ranging from 49% to 63%.

The results shows that these saved resources would be beneficial to improve the Cell capacity (especially for URLLC/mMTC users), proving it an example method. Additionally, with this method, Cell Throughput is also improved by 1 Mbps for Scenario 1 and 10 Mbps for Scenario 2. Internal processing delay and latency in clearing UE context is avoided significantly up to ~2962 ms (in extreme cases where all HARQ retransmissions are scheduled after expiry of CRT window).

FIG. 24 illustrates a block diagram illustrating a structure of a UE according to an embodiment of the disclosure.

Figure 6:
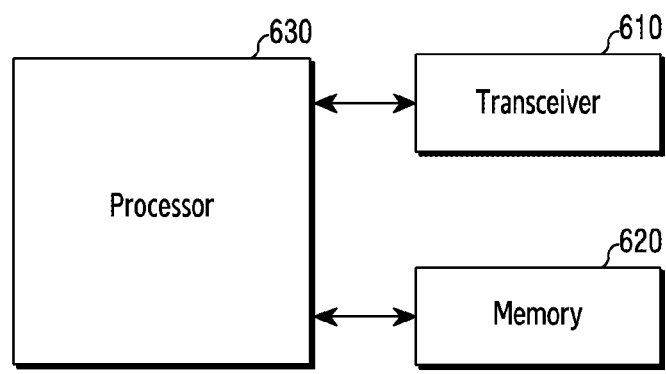
FIG. 6 illustrates a block diagram illustrating a structure of a UE according to an embodiment of the disclosure.

As shown in FIG. 6, the UE according to an embodiment may include a transceiver 610, a memory 620, and a processor 630. The transceiver 610, the memory 620, and the processor 630 of the UE may operate according to a communication method of the UE described above. However, the components of the UE are not limited thereto. For example, the UE may include more or fewer components than those described above. In addition, the processor 630, the transceiver 610, and the memory 620 may be implemented as a single chip. Also, the processor 630 may include at least one processor.

The transceiver 610 collectively refers to a UE receiver and a UE transmitter, and may transmit/receive a signal to/from a base station or a network entity. The signal transmitted or received to or from the base station or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor 630, a signal through a wireless channel, and transmit a signal output from the processor 630 through the wireless channel.

The memory 620 may store a program and data required for operations of the UE. Also, the memory 620 may store control information or data included in a signal obtained by the UE. The memory 620 may be a storage medium, such as read-only memory (ROM), random access memory (RAM), a hard disk, a CD-ROM, and a DVD, or a combination of storage media.

The processor 630 may control a series of processes such that the UE operates as described above. For example, the transceiver 610 may receive a data signal including a control signal transmitted by the base station or the network entity, and the processor 630 may determine a result of receiving the control signal and the data signal transmitted by the base station or the network entity.

Figure 7:
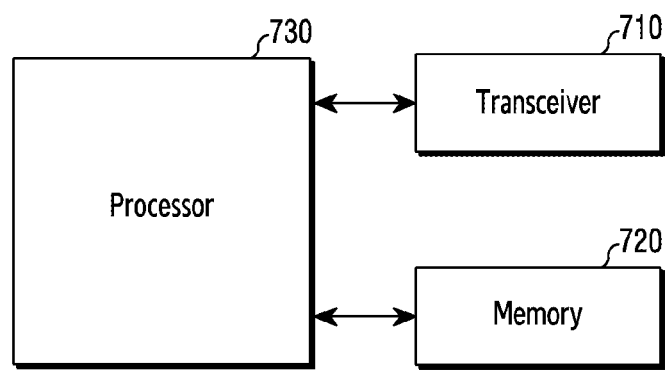
FIG. 7 illustrates a block diagram illustrating a structure of a base station according to an embodiment of the disclosure.

FIG. 7 illustrates a block diagram illustrating a structure of a base station according to an embodiment of the disclosure. FIG. 7 corresponds to the example of the network device of FIG. 3.

As shown in FIG. 7, the base station according to an embodiment may include a transceiver 710, a memory 720, and a processor 730. The transceiver 710, the memory 720, and the processor 730 of the base station may operate according to a communication method of the base station described above. However, the components of the base station are not limited thereto. For example, the base station may include more or fewer components than those described above. In addition, the processor 730, the transceiver 710, and the memory 720 may be implemented as a single chip. Also, the processor 730 may include at least one processor.

The transceiver 710 collectively refers to a base station receiver and a base station transmitter, and may transmit/receive a signal to/from a terminal or a network entity. The signal transmitted or received to or from the terminal or a network entity may include control information and data. The transceiver 710 may include a RF transmitter for up-converting and amplifying a frequency of a transmitted signal, and a RF receiver for amplifying low-noise and down-converting a frequency of a received signal. However, this is only an example of the transceiver 710 and components of the transceiver 710 are not limited to the RF transmitter and the RF receiver.

Also, the transceiver 710 may receive and output, to the processor 730, a signal through a wireless channel, and transmit a signal output from the processor 730 through the wireless channel.

The memory 720 may store a program and data required for operations of the base station. Also, the memory 720 may store control information or data included in a signal obtained by the base station. The memory 720 may be a storage medium, such as read-only memory (ROM), random access memory (RAM), a hard disk, a CD-ROM, and a DVD, or a combination of storage media.

The processor 730 may control a series of processes such that the base station operates as described above. For example, the transceiver 710 may receive a data signal including a control signal transmitted by the terminal, and the processor 730 may determine a result of receiving the control signal and the data signal transmitted by the terminal.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various example embodiments, those skilled in the art will recognize that the embodiments herein can be practiced with modification within the spirit and scope of the embodiments as described herein.

According to various embodiments, a method for optimizing resource allocation to allocate one or more resources performed by a base station (BS), the method comprising: receiving at least one Message 3 (Msg3) from an at least one user equipment (UE); determining whether an optimizing feature is enabled; and performing at least one of: in case that the optimizing feature is enabled, using at least one timer associated with transmission of at least one Message 4 (Msg4) for optimizing the resource allocation; and in case that the optimizing feature is disabled, determining that at least condition is met for optimizing the resource allocation.

In various embodiments, wherein determining that the at least condition is met for optimizing the resource allocation comprises: determining that a duplication of at least one UE identity (UE ID) has occurred based on the received at least one Msg3; incrementing a UE ID duplication counter in response to the determination that the duplication of the at least one UE ID occurred; and determining that the at least condition is met when the UE ID duplication counter meets a first criteria.

In various embodiments, wherein the method further comprises: enabling the optimizing feature; and using the at least one timer for optimizing the resource allocation in response to the determination that the at least one condition is met.

In various embodiments, wherein using the at least one timer for optimizing the resource allocation comprises: starting the at least one timer associated with transmission of the at least one Message 4 (Msg4) upon receiving the at least one Msg3; transmitting the at least one Msg4 to the at least one UE; determining whether the at least one timer has expired; determining whether an acknowledgment (ack) is received for the at least one Msg4 transmitted in response to the determination that the at least one timer has not expired; stopping the at least one timer in response to the determination that the ack is received; re-transmitting the at least one Msg4 in response to the determination that the ack is not received; aborting the re-transmission of the at least one Msg4; incrementing a Msg4 expiry counter; and determining whether the Msg4 expiry counter meets a second criteria in response to the determination that the at least one timer has expired.

In various embodiments, wherein the method comprises: enabling the optimizing feature and resetting the Msg4 expiry counter in response to the determination that the Msg4 counter meet the second criteria; disabling the optimizing feature; and resetting at least one of the UE ID duplication counter and the Msg4 expiry counter in response to the determination that the Msg4 expiry counter does not meet the second criteria.

According to various embodiments, a base station to optimize resource allocation to allocate one or more resources, wherein the base station comprising: at least one memory; and at least one processor, operably coupled to the at least one memory, and configured to: receive at least one Message 3 (Msg3) from an at least one user equipment (UE); determine whether an optimizing feature is enabled; and perform at least one of: in case that the optimizing feature is enabled, use at least one timer associated with transmission of at least one Message 4 (Msg4) for optimizing the resource allocation; and in case that the optimizing feature is disabled, determine that at least condition is met for optimizing the resource allocation.

In various embodiments, wherein, in order to determine that the at least condition is met for optimizing the resource allocation, the at least one processor is configured to: determine that a duplication of at least one UE identity (UE ID) has occurred based on the received at least one Msg3; increment a UE ID duplication counter in response to the determination that the duplication of the at least one UE ID occurred; and determine that the at least condition is met when the UE ID duplication counter meets a first criteria.

In various embodiments, wherein the at least one processor is further configured to: enable the optimizing feature; and use the at least one timer for optimizing the resource allocation in response to the determination that the at least one condition is met.

In various embodiments, wherein to use the at least one timer for optimizing the resource allocation, the at least one processor is configured to: start the at least one timer associated with transmission of the at least one Message 4 (Msg4) upon receiving the at least one Msg3; transmit the at least one Msg4 to the at least one UE; determine whether the at least one timer has expired; determine whether an acknowledgment (ack) is received for the at least one Msg4 transmitted in response to the determination that the at least one timer has not expired; stop the at least one timer in response to the determination that the ack is received; re-transmit the at least one Msg4 in response to the determination that the ack is not received; abort the re-transmission of the at least one Msg4, increment a Msg4 expiry counter, and determine whether the Msg4 expiry counter meets a second criteria in response to the determination that the at least one timer has expired.

In various embodiments, wherein the at least one processor is configured to: enable the optimizing feature and resetting the Msg4 expiry counter in response to the determination that the Msg4 counter meet the second criteria, disable the optimizing feature, and reset at least one of the UE ID duplication counter and the Msg4 expiry counter in response to the determination that the Msg4 expiry counter does not meet the second criteria.

What is claimed is:

1. A method performed by a base station in a wireless communication system, the method comprising:
  receiving, from a user equipment (UE), a Message 3 (Msg3);
  determining that an optimizing feature is enabled;
    starting a timer associated with a Message 4 (Msg4) for optimizing a resource allocation;
  transmitting, to the UE, the Msg4;
  determining that the timer is expired;
  incrementing a Msg4 expiry counter according to the expired timer;
  aborting a re-transmission of the Msg4 upon determining that the timer is expired; and
  in response to the incremented Msg4 expiry counter meeting a first threshold value, resetting the Msg4 expiry counter.

2. The method of claim 1, further comprising:
  identifying a duplication of at least one UE identity (UE ID) based on the Msg3; and
  incrementing a UE ID duplication counter according to the duplication of the at least one UE ID,
  wherein, in case that the incremented UE ID duplication counter meets a second threshold value, the optimizing feature is enabled.

3. The method of claim 1, further comprising:
  in case that an acknowledgment (ACK) for the Msg4 is received, stopping the timer; and
  in case that the ACK for the Msg4 is not received, re-transmitting the Msg4.

4. The method of claim 1, further comprising:
  in case that the incremented Msg4 expiry counter does not meet the first threshold value, resetting the UE ID duplication counter and the Msg4 expiry counter.

5. A base station in a wireless communication system, the base station comprising:
  at least one processor;
  memory storing instructions that, when executed by the at least one processor, cause the base station to:
  receive, from a user equipment (UE), a Message 3 (Msg3),
  determine that an optimizing feature is enabled,
    start a timer associated with a Message 4 (Msg4) for optimizing a resource allocation,
  transmit, to the UE, the Msg4;
  determine that the timer is expired;
  increment a Msg4 expiry counter according to the expired timer;
  abort a re-transmission of the Msg4 upon determining that the timer is expired; and
  in case that the incremented Msg4 expiry counter meets a first threshold value, reset the Msg4 expiry counter.

6. The base station of claim 5, wherein the instructions that, when executed by the at least one processor, cause the base station to:
  identify a duplication of at least one UE identity (UE ID) based on the Msg3, and;
  increment a UE ID duplication counter according to the duplication of the at least one UE ID,
  wherein, in case that the incremented UE ID duplication counter meets a second threshold value, the optimizing feature is enabled.

7. The base station of claim 5, wherein the instructions that, when executed by the at least one processor, cause the base station to:
  in case that an acknowledgment (ACK) for the Msg4 is received, stop the timer, and
  in case that the ACK for the Msg4 is not received, re-transmit the Msg4.

8. The base station of claim 5, wherein the instructions that, when executed by the at least one processor, cause the base station to:
  in case that the incremented Msg4 expiry counter does not meet the first threshold value,
  reset the UE ID duplication counter and the Msg4 expiry counter.

* * * * *